Sept. 9, 1952     D. SILVERMAN     2,609,885

SEISMIC-WAVE GENERATION

Filed Dec. 29, 1950     4 Sheets-Sheet 1

INVENTOR:
DANIEL SILVERMAN
BY Newell Pottof
ATTORNEY

Sept. 9, 1952   D. SILVERMAN   2,609,885
SEISMIC-WAVE GENERATION
Filed Dec. 29, 1950   4 Sheets-Sheet 2

*INVENTOR:*
DANIEL SILVERMAN
BY Newell Pottoff
ATTORNEY

Sept. 9, 1952  D. SILVERMAN  2,609,885
SEISMIC-WAVE GENERATION
Filed Dec. 29, 1950  4 Sheets-Sheet 3

INVENTOR:
DANIEL SILVERMAN
BY Newell Pottorf
ATTORNEY

Patented Sept. 9, 1952

2,609,885

UNITED STATES PATENT OFFICE 2,609,885

SEISMIC-WAVE GENERATION

Daniel Silverman, Tulsa, Okla., assignor to Stanolind Oil and Gas Company, Tulsa, Okla., a corporation of Delaware Application December 29, 1950, Serial No. 203,292

4 Claims. (Cl. 181—0.5)

This invention relates to geophysical surveying by the seismic-wave reflection method and is directed particularly to an improved source for the generation of artificial seismic waves for carrying out such surveys in marine areas and in areas on land where difficulties are encountered due to the noise generated by the seismic-wave source.

One of the drawbacks limiting the use of the seismic method in marine areas is the damage to marine life and installations done by the explosion of charges used for the source of artificial seismic waves. Because of the damage done, seismic surveying is entirely prohibited in certain marine areas, and in all cases there is a tendency to limit the amount of shooting performed in order to hold the damage to marine life and installations to a minimum.

While the seismic method of geophysical surveying on land prospects has been generally successful, there are areas of very definite interest where the usefulness of the method is severely limited due to the generation of noise by the explosive shot used as the seismic-wave source. In shot holes this noise is frequently of such character that it can be picked up by the seismic detectors along with the desired waves, and is frequently of such magnitude as to make recognition of the desired waves virtually impossible.

When using patterns of explosives arranged in the air above the ground surface as the seismic-wave source, a frequent objection and difficulty is the blast noise of the exploding charges, which both creates air or ground waves that interfere with the reception of the desired seismic waves and air shock-wave noise which is objectionable to the residents of the immediately surrounding area.

One of the solutions frequently suggested for these difficulties of noise generation comprises the use of linear explosives in various forms or of spaced individual charges fired in certain sequences. While, in some cases, these give an improved signal-to-noise ratio, nevertheless the level of noise generation by the individual charges may still be objectionably high. In general, the use of linear explosives of considerable extent has been confined to shallow trenches at the ground surface or above the base of or in the weathered layer, with the result that much of the useful seismic energy is absorbed in the weathered layer before it even reaches the subsurface to produce desired reflections.

Accordingly, it is a primary object of my invention to provide an improved source of seismic waves useful either for marine surveying or in shot holes or air-shot patterns on land where the problems of noise generation and damage by the shot are severe. Another object is to provide a source of seismic waves having a strongly directional effect which discriminates against the production of noise or damage in directions other than that in which the wave propagation is desired. A further object is to provide a source of seismic waves, particularly for marine seismic surveying, capable of directing the energy downwardly and substantially preventing its propagation laterally, so that damage to marine life is minimized except at the exact point below the shot. A still further object is to provide a configuration of explosives for a seismic-wave source having a very low noise-generation level in directions other than that desired for the propagation of wave energy. Other and further uses, objects, and advantages of the invention will become apparent as this description proceeds.

Briefly stated, the foregoing and other objects are accomplished by a vertical distributed charge of explosive of considerable length so arranged that the component of the detonation velocity in the direction of the vertical axis of the charge is equal to the seismic-wave velocity in the surrounding medium. Thus, in the case of charges for use in water, the effective detonation velocity of the charge is matched approximately to the 5,000-foot-per-second velocity of seismic-wave propagation in water. By distributing the charge over an extensive length, the charge may also be surrounded by a metallic shield member which further prevents propagation of waves in a lateral direction. The distribution of the total explosive charge over the extensive distance results in the unit pressure exerted by the charge explosion at any one point being smaller than that which would disrupt the surrounding medium or shield, while, at the same time, the explosion pressures built up in the direction of wave propagation are of similar magnitude to those of a concentrated charge of the same weight.

The use of similarly distributed charges in shot holes with the velocity matched to that of the surrounding earth medium results in less crushing of the rock than spaced charge units or a single concentrated charge without, however, seriously reducing the maximum pressure exerted in the vertical downward direction. Similarly, the extended distribution of charge material in an air shot permits surrounding the charge with a shielding member which substantially reduces the energy propagation in a lateral direction, thus reducing the objectionable blast noise associated with such shots. This will be better understood by reference to the accompanying drawings forming a part of this application, in the different figures of which drawings the corresponding numerals designate the same or corresponding parts. In the drawings:

Figure 4:
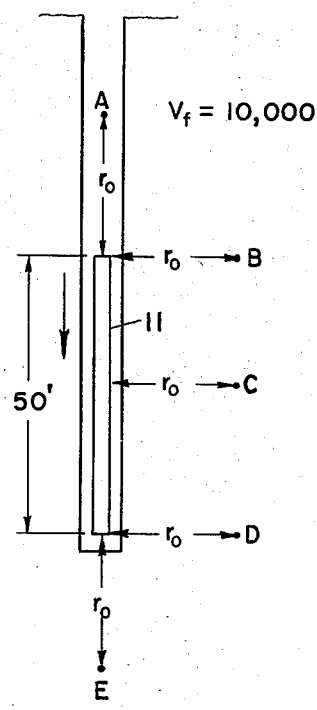
Figure 4 is a diagrammatic representation of a linear charge and points of pressure measurement discussed.
Figure 5:
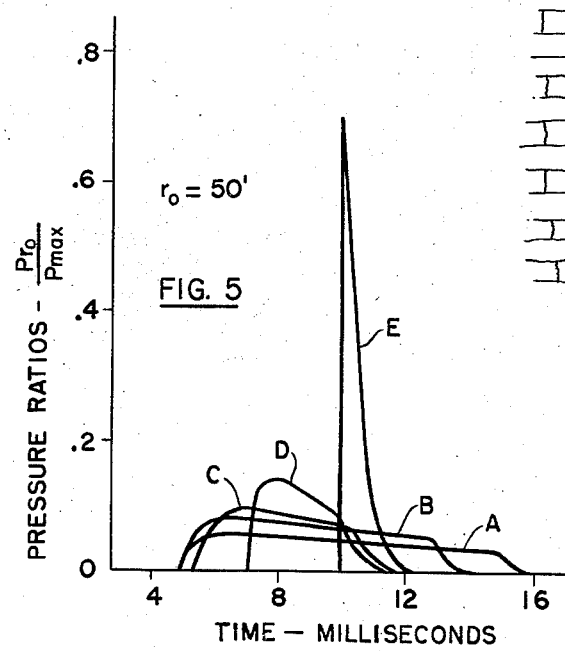
Figure 6:
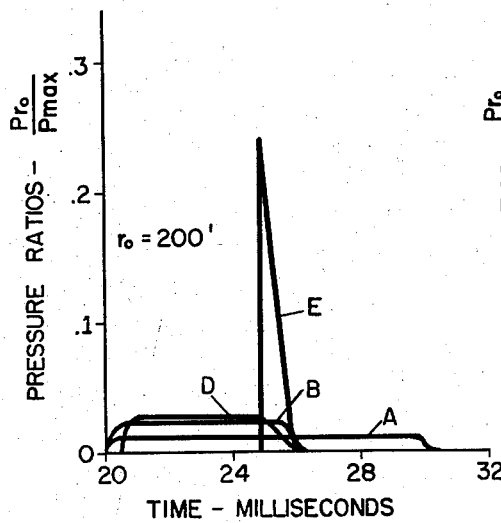
Figure 7:
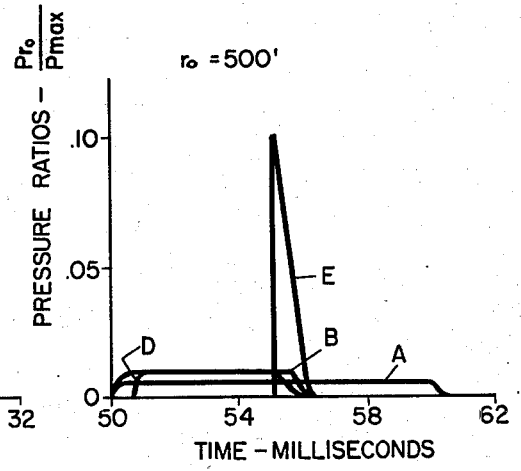
Figure 8:
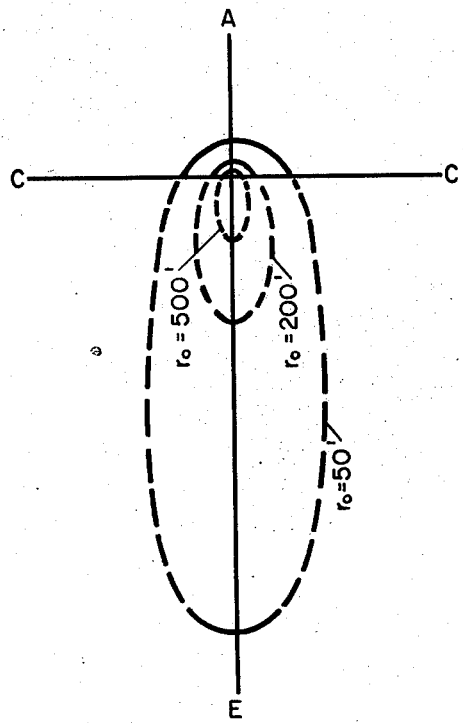
Figure 9:
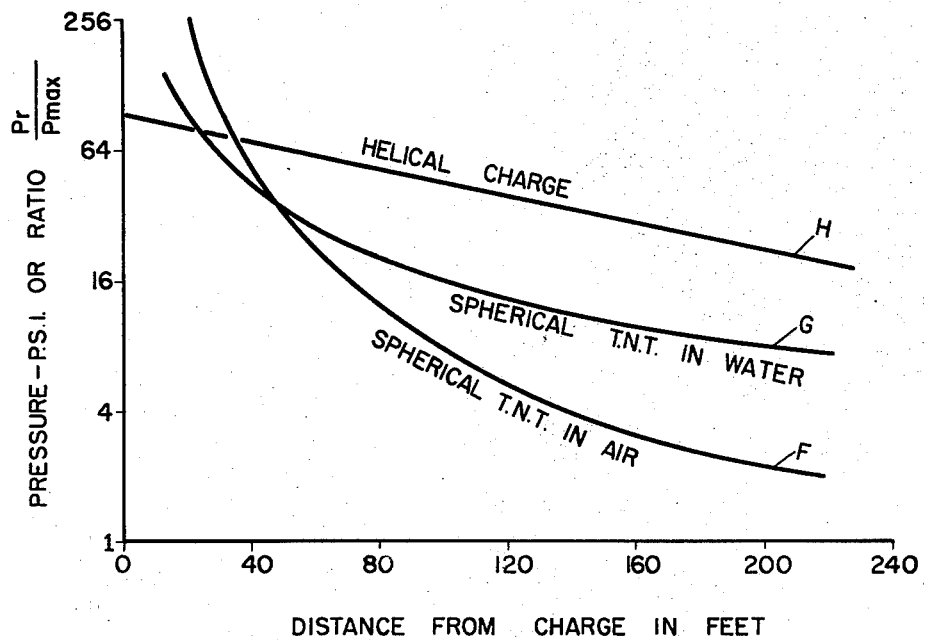

Figures 5, 6, and 7 are, respectively, graphs of the pressure-time relations existing around the charge of Figure 4 at the designated points of measurement;

Figure 8 is a diagram summarizing the data presented in Figures 5, 6, and 7; and Figure 9 is a graph comparing the pressure distributions of conventional charges with a charge embodying the invention.

Figure 1:
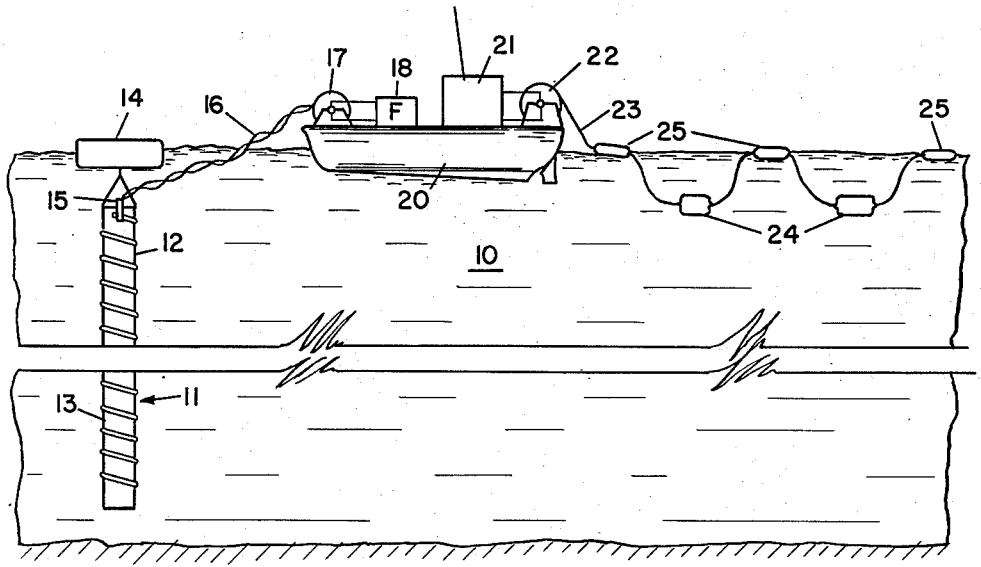
Figure 1 shows a body of water in cross section with an embodiment of the invention adapted for marine seismic surveying immersed therein.

Referring now to these drawings, and particularly to Figure 1 showing an embodiment of the invention adapted for marine seismic surveying, immersed in a body of water 10 is an explosive charge 11 consisting of a helix of linear explosive 12 wrapped about an elongated, cylindrical or tubular form 13 suspended vertically below the surface of water 10 from a float 14 on the water surface. At the upper end of helix 12, which is preferably at or near the water surface, is a cap or similar detonating charge 15 connected by wires 16 to a reel 17 and thence to a firing circuit 18 located on a transporting vessel 20. The vessel 20 may also carry conventional amplifying and recording equipment 21 which is connected by a conductor cable 23 wound on a reel 22 to seismic detectors 24 supported below the surface of water 10 by floats 25.

In accordance with my invention, the pitch of the helical linear explosive 12 is so chosen that the component of detonation velocity of the explosive in the direction of desired wave propagation, that is, along the axis of the tubular form 13, is substantially equal to the seismic-wave propagation velocity in water 10—namely, about 5,000 feet per second. Stated another way, the angle between a line tangent to the linear explosive 12 in the helix and the axis of the form 13 is so chosen that its cosine is equal to the ratio of the seismic-wave velocity in water to the detonation velocity within explosive 12. The length of charge 11 in shallow water is preferably as great as can be permitted. In deep water, it is preferably at least 15 or 20 feet or more in length, and may be very much longer so that the total amount of explosive at any point of the helix is relatively small, whereas the total aggregate of explosive in the entire charge is sufficient to create the desired seismic energy. A particularly desirable limitation on charge length where space is not a limiting factor is that the time of travel of the detonation from end to end of the charge should be about .01 second, which is a substantial fraction of the period of the average reflected seismic wave. In cases where a single charge 11 is insufficient to generate the desired energy, a number of such charges, close together or spaced at somewhat separated points, may be detonated simultaneously to create the necessary seismic energy.

When firing circuit 18 is energized to detonate cap or primer 15 and fire charge 11, the detonation propagates along the line of the explosive 12 so that it goes around the helix and travels from the top end of charge 11 to the bottom end in just the same time as the seismic wave created in the surrounding water medium 10 is propagated to the same distance, that is, a distance equal to the length of charge 11. This results in a building up or concentration of the explosion pressure which becomes a maximum in the downward direction but is less than the maximum in all other directions, that is, laterally and upward. Consequently, the maximum explosion pressure is exerted only in the single direction desired for propagation of the seismic waves, namely, downwardly in this example, while the pressure in all other directions around charge 11, due to the fact that the charge is distributed over a space of considerable extent, is insufficient to cause serious damage to the surrounding marine life. This is in contrast to the pressure distribution around one or more concentrated charges, where the wave pressures and resultant damage are substantially equal in all directions radially from the center of the charge or charges.

Placing of the cap 15 and the upper end of charge 11 close to or at the water surface insures that the gases created in the explosion will be released to the atmosphere instead of forming a closed bubble beneath the water surface, which, as is well known, creates multiple pulses of seismic energy that result in confusing records.

Figure 2:
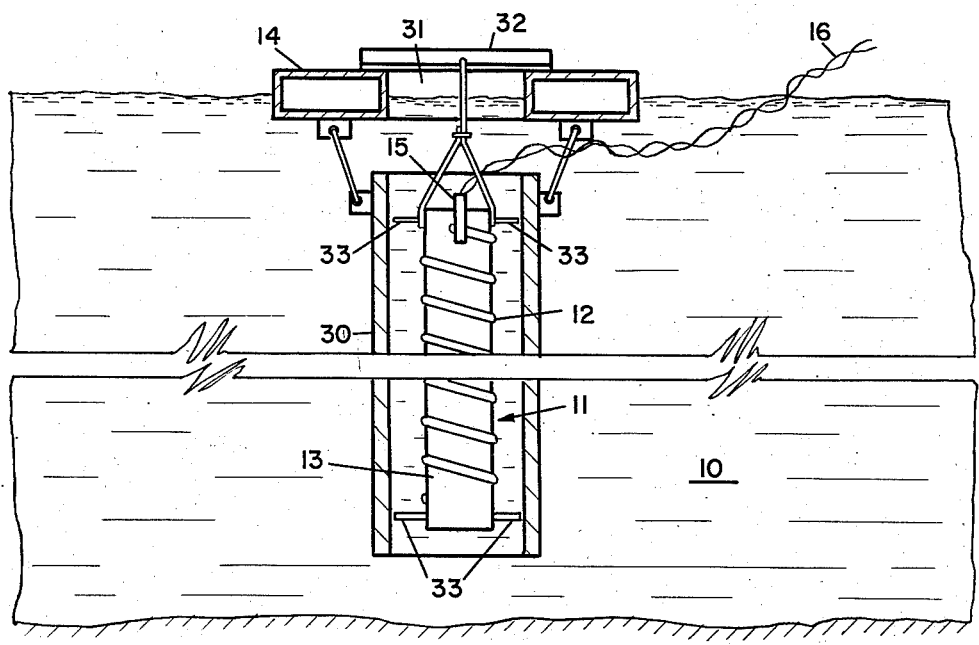
Figure 2 is the modification of the charge embodiment of Figure 1.

The property of charge 11 of concentrating the highest or maximum explosion pressures only in a downward axial direction makes possible the embodiment illustrated in Figure 2, which is a further improvement over that of Figure 1, particularly as regards the propagation of energy and causing of damage in a lateral direction. A steel pipe or tube 30, of somewhat larger internal diameter than the external diameter of charge 11 and helical explosive 12, is suspended by one end vertically from the float 14. The pipe 30, preferably open at the top end and either open or closed by a thin flexible diaphragm at the bottom, is somewhat longer than the charge 11, so that it almost entirely surrounds the charge. Whereas, in the embodiment of Figure 1, the float 14 may be considered expendable and thus has to be renewed for each charge detonated, in the case of Figure 2, it is preferably more sturdily constructed and provided with an opening 31 through which the charge 11 is lowered into position and through which the explosion gases from the charge are released into the atmosphere above the water surface. An expendable crosspiece 32 of wood or the like across opening 31 suspends the charge 11 at the correct position and depth within pipe 30 or it can be supported by resting on a cross bar at the bottom end of the pipe. Dowels 33 projecting from the tubular form 13 maintain charge 11 centralized within the pipe 30.

Detonation of this partly enclosed or shielded charge by firing circuit 18 in the same manner as in Figure 1 similarly causes the detonation of the explosive around the helix from the top end of the charge toward the bottom. The build-up of explosion pressures around charge 11 is similar to that in the Figure 1 embodiment, particularly in the vertical direction; however, the energy directed laterally is almost totally reflected from the inner surface of tube 30, so that it is either absorbed within the medium inside the tube or emerges from the ends traveling in a more nearly vertical direction. In any event, the result is a considerably reduced propagation of energy in a horizontal direction and a correspondingly reduced amount of damage to the surrounding marine life. This confining of the lateral explosion pressures by the tube 30 is made possible by the fact that the amount of explosive at any point along the total length of the linear explosive 12 is insufficient to create pressures sufficient to rupture the tube 30 across the space between the explosive and the inside surface of the tube 30, particularly when the expanding gases are permitted free movement up the pipe to be vented at the top.

As in the case of the embodiment shown in Figure 1, when insufficient energy is provided by a single charge arranged as in Figure 2, greater energy may be provided by a multiplicity of such charges, either in separate tubes nested together in a group or spaced apart somewhat from each other and simultaneously detonated.

In the case of charges detonated in the air above the ground surface for creating seismic waves in surveying on land prospects, the embodiment of Figure 2 is particularly applicable. The surrounding of a distributed vertical charge 11 suspended in the air above the ground surface by a tubular shield 30 considerably reduces the amount of energy propagated laterally and correspondingly reduces the objectionable noise of the air-blast resulting from detonation of these charges. This permits use of the air-shot method of seismic-wave generation in areas where its use would otherwise be impossible due to objections of the people resident in the surrounding area.

Figure 3:
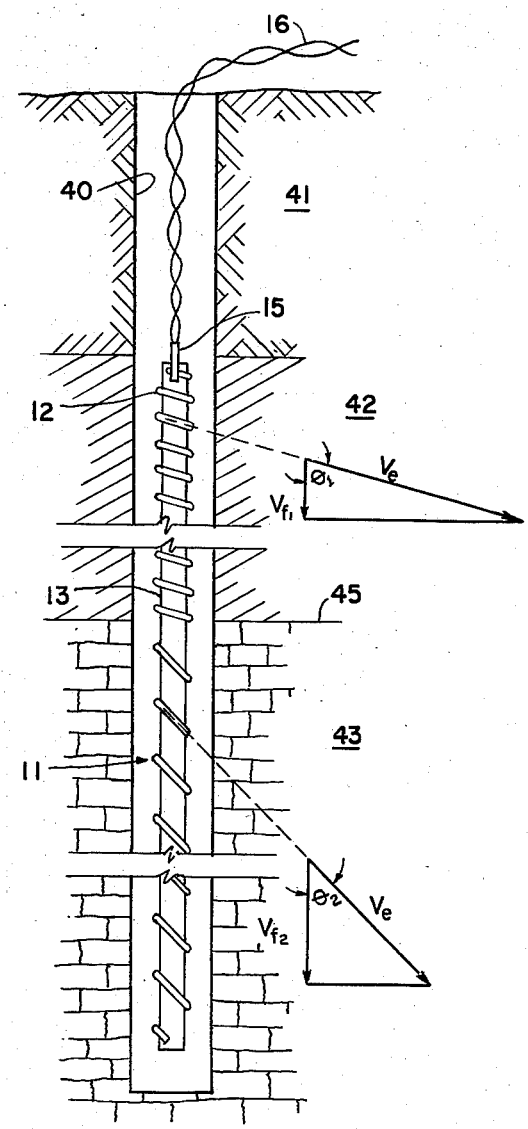
Figure 3 shows an adaptation of the invention for use in surveying in a bore hole on land shown in cross section.

In Figure 3 is shown an embodiment of my invention applicable to shooting in bore holes on land. In this case, a bore hole 40 penetrates a plurality of formations 41, 42, and 43. Assuming that formation 41 represents the low-velocity weathered layer, it is ordinarily preferable to place the entire elongated charge 11 below this layer. If, for example, the formation 42 below the weathered layer 41 has a seismic-wave propagation velocity of $V_{f_1}$, then the angle $\theta_1$ of the tangent to the helix 12 opposite this formation relative to the charge axis is chosen to have the value $$\theta_1 = \cos^{-1} \frac{V_{f_1}}{V_e} \quad (1)$$

where $V_e$ is the velocity of detonation of the explosive in helix 12. Assuming also, for example, that the formation 43 has a different seismic-wave propagation velocity $(V_{f_2})$, then that portion of charge 11 extending through this lower formation should have a different angle of pitch $\theta_2$, defined as $$\theta_2 = \cos^{-1} \frac{V_{f_2}}{V_e} \quad (2)$$

In field operations, it is convenient to assemble such a charge by having available unit charges of different lengths and of different angles of helical pitch and then to make up the charge with portions of correct length and pitch angle by joining together the different units and placing the junction point at the stratum boundary layers, such as that designated at the depth 45. It is, in any event, the essence of my invention that the angle between the direction of the linear charge material forming the helix at any point and the direction of the axis of tubular form 13 be given by the above relation.

Other ways of forming the linear explosive material than simply shaping it as a cord or fabric-reinforced tube or rod of explosive are to insert the explosive in granular form into a flexible tube or sheath of vinyl plastic or the like which can be wound on a supporting form; or, the form itself may be precast, for example, of plaster of Paris, with a helical groove into which the explosive in plastic form is pressed or moulded, the whole being covered by a waterproof coating or sheet. The latter type of charge is particularly desirable for use in bore holes on land, as the turns of explosive are well protected against damage by abrasion against the hole wall during placement.

A helix has been chosen and illustrated as only one of the simplest means of assembling a charge having these propagation-velocity properties. The linear explosive could equally well be arranged in a zig-zag, serpentine, or any other similar shape which would preserve the angle $\theta$ between the tangent to the linear explosive and the direction of propagation. It will be understood that the foregoing assumes that the detonation velocity of the explosive is always higher than the seismic-wave velocity to be matched. If the two velocities are equal, as in the case of an explosive having a relatively low detonation velocity, or the case of a high seismic-wave velocity, then obviously the helix 12 becomes a simple straight-line charge. It is, of course, always necessary to use an explosive whose detonation velocity is at least as high as the seismic-wave velocity being matched, as otherwise the essential limitation of this invention cannot be met.

In operation, the charge 11 in bore hole 40 is detonated by a suitable firing circuit 18 as in Figure 1, and a record is made of the seismic waves after reflection from subsurface strata as in that figure or in any conventional manner.

When the component of explosive detonation velocity in the direction of desired wave propagation has been chosen as indicated above, the charge has the properties of that illustrated in Figure 4 which shows diagrammatically an assumed example and the points of determination of explosion pressures around it. Taking as an example a seismic-wave velocity of the medium surrounding charge 11 of Figure 4 of 10,000 feet per second, assuming that the same velocity of detonation for the charge 11 has been arranged by adjusting the helical pitch angle as described, and assuming further an overall charge length of 50 feet, the explosion pressures due to detonation of the charge 11 from the end nearest point A toward the end nearest point E at the various designated points and distances around the charge have been determined.

Figure 5 shows the pressure as a function of time determined at the various points designated by the capital letters A, B, C, D, and E of Figure 4. The ordinates of Figure 5 represent the ratio of the pressure $P_{r_0}$ at the point in question at $r_0$ distance, to the maximum value of pressure $P_{max}$ existing at a point near the surface of the exploding charge. The various plots of Figure 5 designated by the different letters A, B, etc. are the pressures in terms of this maximum value as a function of time. It will be observed that at a distance of 50 feet the maximum value of pressure is relatively small in all directions except toward the point E, where the pressure is still nearly .7 of its maximum value near the charge.

At distances of $r_0$ equal to 200 feet in the various directions from the charge designated by the letters in Figure 4, the directional properties of the charge also persist, as is shown in Figure 6. The maximum pressure is still in the direction of point E and is many times the maximum pressure in any of the other directions shown. Direct comparison between Figures 5 and 6 should take account of the fact that the scale of the ordinates in two figures involves a factor of two in order to present more clearly in Figure 6 the shape of the pulses at points A, B, and D which would otherwise be of such small amplitude as to be difficult to observe. As far as the absolute magnitude of the maximum pressure in the direction of the point E is concerned, it is still more than .2 of the maximum pressure observed near the exploding charge.

Even for the points of observation at distances of $r_0$ equal to 500 feet, as is shown in Figure 7, the directional quality of this charge persists. At this distance, the pressure in the direction of point E is still nearly .1 of its maximum value, whereas the maximum pressures of the pulses in direction of points A, B, and D are all 1% or less of the original maximum pressure.

Although the length of the charge in the assumed example of Figure 4 has a value of 50 feet, this is to be considered as by no means a limitation. To obtain the maximum benefit of my invention, the charge should be as long as possible, so that the amount of explosive per unit length of the charge can be as small as possible. Employing the smallest possible amount of explosive per unit length reduces the amount of deformation or crushing of the medium very close to the charge and correspondingly reduces the amount of energy wasted in such crushing and reduces the generation of extraneous seismic noise. In a number of instances, I have observed that, in order for the amount of noise reduction due to the distributed charge to be significant, the charge has to be 15 or more feet in length. There appears, however, to be no limitation on the maximum length other than the space available into which to place the charge.

In marine exploration in deep-water areas and in many land areas, notably the thick surface limestone on the Edwards Plateau in the southwestern part of Texas, it is advantageous to use very long charges in order to achieve a maximum signal-to-noise ratio. By "long" charges in these cases is meant from perhaps 100 feet to several hundred feet in length, measured along the axis of the charge.

The directional properties of the configuration of explosive of my invention shown in Figure 4 and plotted in Figures 5, 6, and 7 are summarized in Figure 8. In this figure the maximum pressure in each direction measured at each of the three distances of $r_0$ equal to 50, 200, and 500 feet is shown diagrammatically as a type of polar diagram. The maximum pressures in the various directions are plotted at radial distances from the origin approximately proportional to the value of the maximum pressure in that direction. It will be noted that, while there is some uncertainty as to the shape of these curves between the line C—C and the point E, there is no uncertainty whatsoever that the pressure in the direction the point E is a maximum regardless of the value of $r_0$, being at least and perhaps even more strongly directional when $r_0$ is equal to 500 feet than when it is 50 feet. Although this particular diagram is dependent upon the particular conditions chosen as to length of charge and the like, it is qualitatively the same as long as the component of detonation velocity in the direction of the charge axis is made substantially equal to the seismic-wave propagation velocity in the surrounding medium and the charge itself is of substantial length.

About the only precaution which is important, particularly in employing this charge for seismic-wave generation by air shots, is that the space between the adjacent turns of the helix must be sufficiently great to prevent cutting of the helix by shock waves transmitted directly through the surrounding medium (air) from turn to turn, before the detonation has progressed one complete revolution around the helix. If the turns are too closely spaced, this shock wave may cut the line of explosive and interrupt the detonation. This effect has not been noted in charges detonated under water in either marine shooting or in shot holes on land. Regardless of how close the adjacent turns of explosive have been spaced in these cases, down to perhaps 2 inches, it appears that the detonation wave of the explosive follows the path of the helix rather than cutting across between turns. Consequently, rather small diameters of charge can be used in these cases, for example, approximately 4 inches having been successfully detonated in this manner.

Figure 9 is presented to make clear a very important distinction between the distributed charge of this invention and ordinary concentrated charges. In this figure are shown as curves F and G the actual pressures in pounds per square inch, plotted logarithmically, as a function of radial distance in feed from spherical charges of TNT exploding respectively in air and in water. Both curve F and curve G show a rapid decline in unit pressure with distance from the charge, curve F for air dropping off even more rapidly than curve G for water, as might be expected. Calculation shows that, over a considerable portion of the region shown, curve G for water varies approximately as the function $K/R^{(1.13)}$, where K is a constant and R is radial distance, 1.13 being the exponent.

On the other hand, curve H for a helical charge, plotted to the same distance scale but with the ordinates in terms of the ratio $$\frac{P_{r_0}}{P_{max.}}$$

(with 100 p. s. i. for curves F and G coinciding with a value of 1.00 for the ratio) drops off much less rapidly in the direction of detonation and wave propagation, which this curve represents. In the region shown this curve represents a function $$\frac{K}{R}(.7 \text{ to } .9)$$

where the exponent of R, being between .7 and .9, is thus less than unity (1.00) rather than greater than unity, thus demonstrating that for these distances, even though substantial, and in this one direction, the usual radial pressure-decay law does not hold. It is believed that this improved or more favorable pressure distribution—a kind of focusing—is responsible for the improved results obtainable by employing the present invention.

While I have thus described my invention in terms of the foregoing specific embodiments and examples, it is to be understood that these are by way of illustration only and that the invention should not be considered as limited to the described details. Its scope should rather be ascertained by reference to the appended claims.

I claim:

1. A source of seismic waves for seismic reflection surveying comprising an elongated vertical helix of linear explosive material, and a detonator for said explosive at one end of said helix, the pitch of said helix being adjusted to produce an effective velocity of detonation of said explosive material in the direction of the helical axis substantially equal to the seismic-wave propagation velocity in an immediately surrounding wave-propagating medium.

2. A source of seismic waves for seismic reflection surveying comprising a substantially cylindrical, vertical form, a helix of linear explosive material formed about said cylindrical form and extending from end to end thereof, and a detonator for said explosive at one end of said helix, the pitch of said helix being adjusted to produce an effective velocity of detonation of said explosive material in the direction of the helical axis substantially equal to the seismic-wave propagation velocity in an immediately surrounding wave-propagating medium.

3. An elongated helical explosive as in claim 2 in which the length of said linear explosive material is such as to require at least .01 second for the detonation wave to travel from end to end of the explosive.

4. A source of seismic waves for seismic reflection surveying comprising an elongated, vertical, helical, linear explosive, the pitch of the helix of said explosive being such that the effective velocity of explosive detonation in the direction of the helical axis is substantially equal to the seismic-wave propagation velocity in a surrounding wave-transmitting medium, a metallic tubular shield open at at least one end substantially surrounding and of greater length than said helical explosive, and means for initiating detonation of said explosive at one end of said helix.

DANIEL SILVERMAN.

REFERENCES CITED

The following references are of record in the file of this patent:

UNITED STATES PATENTS

| Number | Name | Date |
|---|---|---|
| 2,491,692 | Shimek | Dec. 20, 1944 |